United States Patent
Ludwig et al.

(10) Patent No.: US 9,534,882 B2
(45) Date of Patent: Jan. 3, 2017

(54) DEVICE AND METHOD FOR DRIVING A DOOR

(75) Inventors: Heinz Ludwig, Hannover (DE); Uwe Nolte, Barsinghausen (DE); Guido Sonntag, Gehrden (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 58 days.

(21) Appl. No.: 14/111,723

(22) PCT Filed: Mar. 20, 2012

(86) PCT No.: PCT/EP2012/054871
§ 371 (c)(1),
(2), (4) Date: Oct. 14, 2013

(87) PCT Pub. No.: WO2012/139860
PCT Pub. Date: Oct. 18, 2012

(65) Prior Publication Data
US 2014/0035506 A1 Feb. 6, 2014

(30) Foreign Application Priority Data
Apr. 14, 2011 (DE) .......... 10 2011 007 369

(51) Int. Cl.
*B25J 9/16* (2006.01)
*H02P 6/00* (2016.01)
(Continued)

(52) U.S. Cl.
CPC ............ *G01B 7/003* (2013.01); *E05F 15/603* (2015.01); *E05F 15/632* (2015.01); *H02K 11/21* (2016.01);
(Continued)

(58) Field of Classification Search
CPC ........................... E05F 15/127; H02H 7/0851
See application file for complete search history.

(56) References Cited

U.S. PATENT DOCUMENTS 5,808,893 A * 9/1998 Pugh ................. B23G 1/04
29/38 B
6,091,217 A * 7/2000 Parsadayan ............ E05F 15/41
318/283
(Continued)

FOREIGN PATENT DOCUMENTS

DE 202004015472 U1 1/2005
DE 102008049831 A1 6/2010
(Continued)

OTHER PUBLICATIONS

International Search Report for PCT/EP2012/054871 mailed Jul. 10, 2012.
German OA for 102011007369.8 dated Dec. 15, 2011.

*Primary Examiner* — Eduardo Colon Santana
*Assistant Examiner* — Cortez Cook
(74) *Attorney, Agent, or Firm* — Henry M. Feiereisen LLC.

(57) ABSTRACT

To improve the energy efficiency of electrical drive systems for doors, the electric motor is actuated position-dependently, the electrically driven door is disconnected from the supply network in a resting position, a change of position of the door performed in the state of being disconnected from the grid is detected by a position encoder unit that is independently supplied with power by an energy store, and the change of position is used for position-dependently actuating the electric motor after the supply voltage has been reapplied.

6 Claims, 1 Drawing Sheet

(51) Int. Cl.
  *H02J 9/00*    (2006.01)
  *G01B 7/00*    (2006.01)
  *E05F 15/603*  (2015.01)
  *E05F 15/632*  (2015.01)
  *E05F 15/643*  (2015.01)

(52) U.S. Cl.
  CPC ........ *E05F 15/643* (2015.01); *E05Y 2400/336* (2013.01); *E05Y 2400/452* (2013.01); *E05Y 2400/61* (2013.01); *E05Y 2400/612* (2013.01); *E05Y 2800/00* (2013.01); *E05Y 2800/40* (2013.01); *E05Y 2900/132* (2013.01)

(56) References Cited

U.S. PATENT DOCUMENTS

| | | | |
|---|---|---|---|
| 6,308,644 B1 * | 10/2001 | Diaz | E05G 5/003 |
| | | | 109/6 |
| 7,382,063 B2 * | 6/2008 | Mullet | E05F 15/00 |
| | | | 307/64 |
| 2003/0177698 A1 * | 9/2003 | Haag et al. | 49/342 |
| 2007/0214722 A1 * | 9/2007 | Oxle | G05B 19/4061 |
| | | | 49/31 |
| 2008/0315865 A1 | 12/2008 | Doogue et al. | |
| 2009/0265992 A1 * | 10/2009 | Hass | E05F 15/63 |
| | | | 49/340 |
| 2010/0096092 A1 * | 4/2010 | Liu | E05F 15/70 |
| | | | 160/310 |
| 2012/0022699 A1 | 1/2012 | Hoopmann et al. | |

FOREIGN PATENT DOCUMENTS

| | | |
|---|---|---|
| DE | 102009014130 A1 | 9/2010 |
| DE | 102011007369.8 | 4/2011 |
| WO | 2010/108585 A1 | 9/2010 |

* cited by examiner

DEVICE AND METHOD FOR DRIVING A DOOR

CROSS REFERENCE TO RELATED APPLICATIONS

This application is the U.S. national stage of International Application No. PCT/EP2012/054871, filed Mar. 20, 2012 and claims the benefit thereof. The International Application claims the benefits of German Application No. 102011007369.8 filed on Apr. 14, 2011, both applications are incorporated by reference herein in their entirety.

BACKGROUND

Described below are an electrical drive system for a door and to a method for operating an electrically driven door.

Door systems driven by electric motor are sufficiently well-known from the related art. Door systems of the type are usually driven by a rotationally operating electric motor which is supplied with current by a control device in such a way that the door is moved into its desired position (OPEN/SHUT). In order to supply such a drive system with electric power, a power supply unit is provided by which the grid-side supply voltage is converted into a voltage suitable for the door control device.

It is furthermore known to make the drive system aware of the end positions of the door, i.e. fully open or fully closed, with the aid of suitably positioned end switches. Alternatively, however, it is also possible and known to equip the electric motor with an encoder for determining the rotor position and the rotational speed. Taking the transmission ratio realized in the drive system in to account, it is possible to deduce the position of the door by suitable evaluation of the rotor position. Magnetic or optical encoder systems can be used for this purpose.

A distinction is made in principle between absolute and incremental encoders. So-called sine-cosine encoders are often used for determining the angular position of the rotor of the electrical machine or of the rotor shaft. These have the capability to determine the absolute position of the rotor in the range between 0° and 360° with the aid of two sinusoidal oscillations phase-shifted by 90°. With so-called single-turn encoders, the absolute position determination is possible for precisely one revolution. A suitable incrementation is therefore necessary in order to be able to track a change in the position of a door performed by an electric motor, since normally this requires numerous revolutions of the rotor shaft.

In order to be able to determine the absolute position of the door with the aid of such incremental encoder systems, it is first necessary to perform an initialization. For this purpose the door is initially driven into a known position, for example into one of the end positions. Starting from the position, each further position of the door can then be determined based on determination of the angular position of the rotor and the complete rotor revolutions that have already been performed.

However, if the drive system is disconnected from the electricity supply grid, such information about the absolute position of the door determined in the way described is lost. In order to be able to perform a further position determination with the aid of the rotary encoder system after the grid voltage is reapplied, the door must first be driven back into the initialization position.

SUMMARY

The Method Improves the Energy Efficiency of Electrical Drive Systems for Doors.

The electrical drive system includes
a power supply unit for supplying the drive system with power from an electricity supply grid,
an electric motor for driving the door between a first and a second end position,
a position encoder unit for determining a current position of the door,
a control device for position-dependent actuation of the electric motor, and
an energy store for independently supplying the position encoder unit with power, the energy store being dimensioned such that changes in the position of the door during a disconnection of the drive system from the electricity supply grid can be detected by the position encoder unit.

The electrical drive system enables a considerable energy saving to be realized in the case of electrically controlled doors by a surprisingly simple measure, specifically the energy store for independently supplying the position encoder unit with electric power. This is because only the grid-independent power supply of the position encoder unit allows a significant amount of energy to be saved by disconnecting electrical door systems in the end position "SHUT" for example from the electricity supply grid until such time as a new request to open the door is present.

By disconnecting the drive system from the electricity supply grid it is first of all possible to save a not inconsiderable amount of standby power. This fact is sufficiently well-known from a multiplicity of electrical devices. However, if these measures were to be taken into consideration in the case of a known door drive system having an encoder for position determination, a large part of the energy saving would be nullified again due to the fact that a protracted initialization run is necessary after the grid voltage is applied in order to enable absolute position determination. This would not only result in additional energy consumption, but would also lead to unacceptable behavior of the door from the operator's perspective.

Because the energy store is dimensioned such that changes in the position of the door during a power grid outage can be detected by the position encoder unit, it is possible not only to continue storing the most recently assumed position of the door under grid operation, but in addition also to register manually initiated position displacements that, for example, are performed manually while the drive system is not being supplied from the electricity supply grid.

The position encoder unit may include an encoder for determining an electrical measurement variable representing the angular position of the rotor of the electrical machine. Such an encoder can be based on optical or on magnetic measurement principles. The encoder used may be a sine-cosine encoder by which the absolute position, i.e. the angle of the rotor between 0° and 360°, can be sensed within one complete revolution of the rotor. In order to be able to utilize an energy store having the smallest possible dimensions (and therefore available at low cost) for independent power supplies, an encoder having very low standby consumption is advantageously used. In an advantageous embodiment, in order to further minimize energy consumption, the encoder is activated briefly at definable time intervals for the purpose of taking a measurement and subsequently is returned to the idle state.

In a further advantageous embodiment, the position encoder unit includes a processing unit for serially evaluating the electrical measurement variable and for determining the current position of the door. For example, a microcontroller or microprocessor that is specifically trimmed for energy efficiency can be used for the processing unit. A microcontroller of the MSP430 type may be cited here as an example. As soon as the drive system is reconnected to the electricity supply grid after an interruption to the supply, the data is transmitted serially from the microcontroller or microprocessor to the control device of the electric motor.

In a particularly advantageous embodiment, the power consumption of the drive system can be reduced further by intelligent sampling management. In this case the electrical drive system determines a sampling frequency as a function of a current rotor angular velocity, wherein the sampling frequency ensures that at least two angular position measurements of the rotor are performed within one complete revolution of the rotor and wherein the thus determined sampling frequency increases as the rotor angular velocity increases. In an encoder system in which the absolute rotor position can be determined within the angular range from 0° to 360°, at least two angle determinations per revolution of the rotor must be performed in order to be able to carry out an absolute positioning of the door even after a plurality of rotor revolutions. At a low door velocity, which is also necessarily associated with a low rotor angular velocity, the determination of these two measured values can naturally be ensured at a lower sampling rate than at high door or rotor angular velocities. Accordingly it is beneficial, and the basic concept behind the advantageous embodiment addressed here, to vary the sampling frequency as a function of velocity. In this way a great deal of energy can be saved in particular in the standstill state. The sampling frequency for the standstill state must be chosen such that it is ensured that the first two measured values at the startup time of the electric motor are still determined during the first revolution of the rotor shaft. The sampling frequency is subsequently increased as the rotational speed of the rotor increases.

In an advantageous embodiment of the electrical drive system the latter measures the amount of energy present in the energy store and automatically connects the electricity supply grid to the drive system in the event that the amount of energy available for determining the position is inadequate. This ensures that sufficient energy for determining the position is present in the energy store at all times.

In the method for operating an electrically driven door, the electric motor is actuated as a function of position, the electrically driven door is disconnected from the electricity supply grid in an idle position,
a change in the position of the door in the state disconnected from the grid is detected by a position encoder unit which is independently supplied with power by an energy store, and
the change in position is used for the position-dependent actuation of the electric motor after the grid voltage is reapplied.

With this method, the electrically driven door is operated in such a way that a maximum of energy can be saved. As soon as the door has reached an end position, such as the closed position, the drive unit is disconnected from the electricity supply grid in order to save standby energy. However, if the door is moved, for example manually, while the drive system is disconnected from the grid, the change in position caused thereby can nonetheless be detected by the position encoder unit on account of the energy store. As soon as the grid voltage is subsequently reapplied to the drive system, the current position of the door is made available to the door control device, thereby obviating the need for a reinitialization.

A (storage) battery or even a double-layer capacitor of adequate size can be used as an energy store. The energy can furthermore be supplied e.g. by way of two electrical energy stores, of which one is always discharged and the other charged. The energy store should be dimensioned such that data will be retained for at least 72 hours so that a disconnection of the grid supply even over a weekend and beyond will not lead to a new initialization run.

In order to enable as much energy as possible to be saved in the standby operating state, the electricity supply grid is advantageously connected automatically to the drive system when a command for opening or closing the door is present and the drive system is advantageously disconnected automatically from the electricity supply grid as soon as the opening or closing of the door is terminated.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
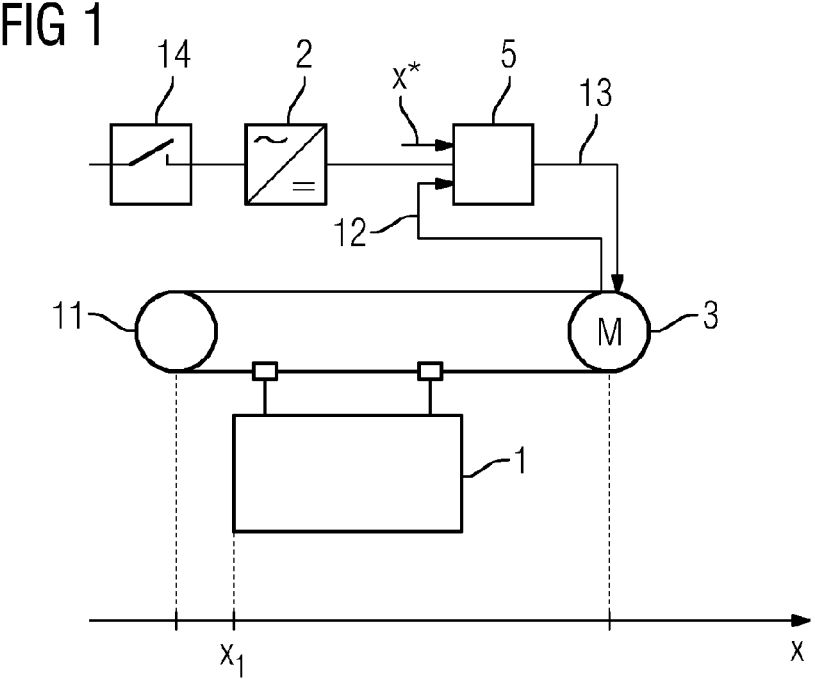
FIG. 1 is a block diagram of a door having an electrical drive system according to an embodiment.

Reference will now be made in detail to the preferred embodiments, examples of which are illustrated in the accompanying drawings, wherein like reference numerals refer to like elements throughout.

FIG. 1 shows a door 1 having an electrical drive system according to an embodiment variant. The door 1 is implemented as a sliding door and can be moved in the x-direction for opening and closing by way of an electric motor 3. As represented schematically here, the electric motor 3 drives a belt connected to the door 1 and tensioned via an idler pulley 11. In this way the rotational movement of the electric motor 3 is converted into a translational movement of the door 1.

It should be mentioned at this point that the method can of course find application not only in connection with sliding doors and translational movements associated therewith, but also with swinging or revolving doors whereby the door travels through a circular arc trajectory during opening and closing.

Any type of electrical machines can be used as the electric motor 3, including a DC motor or an EC motor. Not just rotationally driven machines come into consideration as suitable, however. Rather, it is also conceivable, and included within the scope of the invention, to implement the electric motor as a linear motor and so eliminate the need of the unit depicted in FIG. 1, including idler pulley 11 and the belt which serves to convert the rotational movement of the motor into a translational movement of the door.

The rotationally operating electrical machine 3 shown in the example is actuated by a control device 5 for the purpose of opening and closing the door. Toward that end the control device 5 has for example two or three half-bridges which impress a machine current 13 corresponding to a torque setpoint value into the electrical machine 3.

Power is supplied to the drive system via a power supply unit 2 by which the grid-side alternating-current voltage is converted into a direct-current voltage of a suitable level.

For example, an alternating-current voltage of 230 volts is converted into a direct-current voltage of 40 volts in order to supply the control device 5.

The electric motor 3 includes a position encoder unit (not shown in FIG. 1). The position encoder unit, which will be dealt with in greater detail in connection with the description of FIG. 2, reports an electrical signal 12 to the control device 5. The electrical signal 12 represents the position $x_1$ of the door 1 relative to the end positions ("OPEN", "SHUT"). For example, the signal 12 can directly reflect the position $x_1$. For this purpose the position $x_1$ is determined directly from the signal determined by the position encoder in the position encoder unit. The position encoder, which is linked to the rotor shaft of the electrical machine 3, initially reports information representing the path traveled by the rotor shaft starting from a reference position. This path of the rotor shaft is connected to a travel path x of the door 1 via a system-inherent transmission ratio. Accordingly the position information x can be calculated both already in the position encoder unit and only by the control device 5.

The control device 5 receives a reference position signal x* for the door from the user in an arbitrary manner. Typically, the user generates the command "open door" or "shut door" by a pushbutton or similar device. The command "open door" generates a reference position signal x* for the door, which signal corresponds to the fully open door. From the difference between the reference value x* and the current position $x_1$ of the door 1, the control device 5 can determine a current 13 requiring to be impressed into the electric motor 3 and so drive the door into the open position in accordance with a desired movement profile.

The special feature of the electrical drive system shown here is therefore that it is possible to determine the current position x of the door 1 even when the drive system is disconnected from the grid by way of the switch 14 shown in order to reduce the standby power. This is advantageous in particular when the electrically driven door 1 is opened or closed relatively infrequently. For example, the switch 14 is linked to an actuating element via which the user issues the command for opening or closing the door 1. Only when such a command message is present is the drive system coupled to the electricity supply grid. In this way a considerable amount of energy can be saved.

In a known drive system, however, this measure would necessitate firstly having to perform an initialization run of the door 1 in order to enable the position information 12 to be reported again to the control device 5. This applies in particular when the position of the door 1 has changed during the time the system is disconnected from the grid.

In order to prevent this, the position encoder unit of the electrical machine 3 is fed by an energy store, for example in the form of a storage battery. Accordingly, changes in the position of the door 1 that are performed for example manually by a user with the switch 14 open can also be detected and are immediately available after the electricity supply grid has been reconnected.

A precondition for the described position detection while the drive unit is disconnected from the grid is that the energy store possesses sufficient reserves. Furthermore, a capacitor, in particular a double-layer capacitor, supercap, ultracap, goldcap, etc., can also be used as an energy store.

Irrespective of the type of capacitor it is advantageous if the switch 14 is closed automatically when the energy store used no longer has sufficient reserves in order to enable position detection during operation disconnected from the grid.

Figure 2:
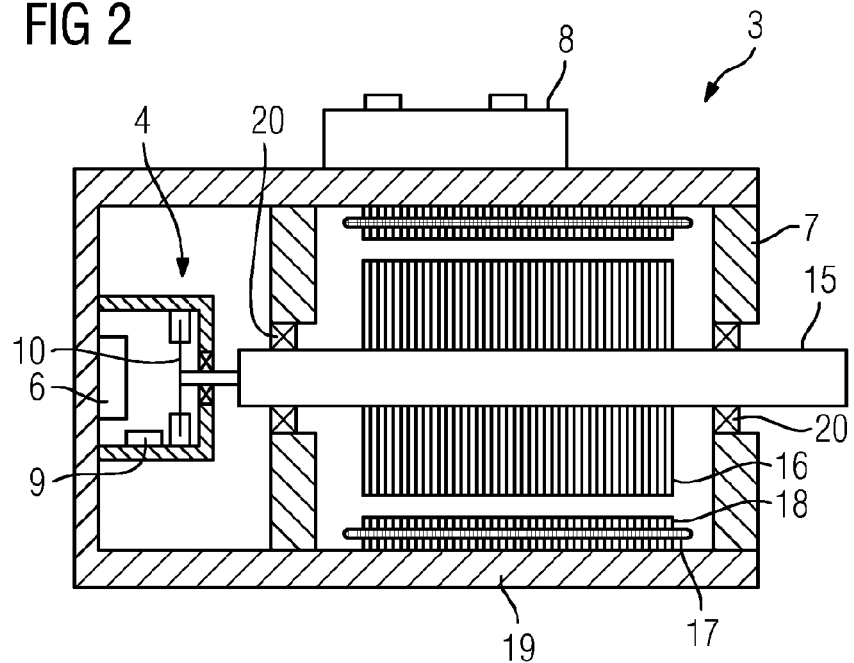
FIG. 2 is a cross section of an electric motor with integrated position encoder unit according to an embodiment.

FIG. 2 shows an electric motor 3 with integrated position encoder unit 4 according to an embodiment variant. The electric motor 3 is a sinusoidally commutated EC motor. A laminated rotor core 16 on which permanent magnets are mounted in order to generate an exciter field is shrink-fitted on a shaft 15 of the electric motor 3. A laminated stator core 18 contains an armature winding 17 which is fed with the machine current in order to drive the door 1 to the user-predefined reference positions. The electric motor 3 is supplied by way of a terminal box 8 with a direct-current voltage which is made available by the power supply device 2 shown in FIG. 1.

The rotor of the electrical machine is contained together with a position encoder unit 4 in a machine housing 19. The position encoder unit 4 includes a sine-cosine encoder 10 which is connected to the rotor shaft 15. The rotor shaft 15, which is mounted inside the housing 19 via ball bearings 20 and end plates 7, accordingly drives a rotating element of the encoder at the rotor angular velocity.

Disposed inside the position encoder unit 4 is a serially operating microcontroller of the MSP430 type which serially evaluates the data of the magnetically operating encoder. The controller is a particularly power-saving variant.

The position encoder unit 4 further includes an energy store 6 in the form of a storage battery. The elements of the position encoder unit 4, i.e. the encoder 10 and the microcontroller 9, are supplied with power by the storage battery, and moreover independently of the electricity supply grid voltage. In order to be able in this way to supply the position encoder unit 4 with energy for as long as possible even in the state disconnected from the grid, the processing unit 9 is implemented in a particularly power-saving design.

Furthermore, the maximum duration of the grid-independent supply to the position encoder unit 4 is substantially increased by intelligent sampling management. The encoder 10 is able to output the position of the rotor shaft 15 in the range from 0° to 360° at any sampling instant. However, in order to be able to make deductions about the absolute position of the door 1, it is also necessary to count the number of complete shaft revolutions as well. In order to be able to guarantee this, at least two sampling instants of the encoder are necessary during a complete revolution of the rotor shaft 15. With regard to the sampling frequency, this means that the sampling frequency must increase as the machine rotational speed increases if efforts are constantly directed at reducing the number of sampling instants to a minimum. At low machine rotational speeds the sampling instants can be spaced further apart from one another, viewed from the time perspective, than at high machine rotational speeds. Corresponding management means is realized with the aid of the microcontroller inside the position encoder unit 4. Between the sampling instants the position encoder unit 4 is placed in an idle state. By selecting an encoder board having particularly low standby consumption it is possible to save a considerable proportion of energy.

Only the grid-independent power supply of the encoder described here enables electrical door systems to be disconnected from the grid during non-usage periods and thereby save energy to a significant degree. Customer acceptance for such a system can also be achieved only on account of the fact that the method obviates the need for new initialization runs after application of the grid supply. Advantageously the switch 14 shown in FIG. 1 could in this case be actuated in such a way by the control device 5 that it closes automatically when a drive command is issued and reopens automatically at the end of the drive operation in order to disconnect the drive system from the grid. Thus, a maximum of standby energy can be saved, while at the same time initialization runs can nonetheless be dispensed with upon reactivation.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An electrical drive system for a door, comprising:
   a power supply unit for supplying the electrical drive system with power from an electricity supply grid;
   an electric motor configured to drive the door between first and second end positions;
   a position encoder configured to determine a current position of the door, including an encoder determining an electrical measurement variable representing an angular position of the rotor of the electrical motor;
   a control device controlling position-dependent actuation of the electric motor;
   a switching device configured to automatically disconnect the electrical drive system, from the electricity supply grid while the door is in idles state;
   an energy store independently supplying the position encoder with power, the energy store being dimensioned such that changes in the position of the door during a disconnection of the drive system from the electricity supply grid can be detected by the position encoder;
   and sampling means, included in the electrical drive system, for determining a sampling frequency as a function of a current rotor angular velocity, so that the sampling frequency ensures at least two angular position measurements of the rotor are performed within one complete revolution of the rotor and the sampling frequency increases as angular velocity of the rotor increases.

2. The electrical drive system as claimed in claim 1, wherein the position encoder unit comprises a processor programmed to serially evaluate the electrical measurement variable and determine the current position of the door.

3. The electrical drive system as claimed in claim 2, further comprising:
   means for measuring an amount of energy in the energy store, and
   means for automatically connecting the electricity supply grid to the electrical drive system when the amount of energy available for determining the position is inadequate.

4. A door with an electrical drive system, the electrical drive system comprising:
   a power supply unit for supplying the electrical drive system with power from an electricity supply grid;
   an electric motor configured to drive the door between first and second end positions;
   a position encoder configured to determine a current position of the door, including an encoder determining en electrical measurement variable representing an angular position of the rotor of the electrical motor;
   a control device controlling position-dependent actuation of the electric motor;
   a switching device configured to automatically disconnect the electrical drive system, from the electricity supply grid while the door is in idles state;
   an energy store independently supplying the position encoder with power, the energy store being dimensioned such that changes in the position of the door during a disconnection of the drive system from the electricity supply grid can be detected by the position encoder; and
   sampling means, included in the electrical drive system, for determining a sampling frequency as a function of a current rotor angular velocity, so that the sampling frequency ensures at least two angular position measurements of the rotor are performed within one complete revolution of the rotor and the sampling frequency increases as angular velocity of the rotor increases.

5. A method for operating an electrically driven door in which the door is moved between first and second end positions by an electric motor, comprising:
   determining a sampling frequency as a function of a current rotor angular velocity, the sampling frequency ensuring that at least two angular position measurements of the rotor are performed within one complete revolution of the rotor and the sampling frequency increases as the rotor angular velocity increases;
   automatically disconnecting the electrically driven door from an electricity supply grid when the door is in an idle state;
   detecting a change in position of the door, while the electrically driven door is disconnected from the electricity supply grid, using a position encoder unit, independently supplied with power by an energy store, configured to determine an electrical measurement variable representing an angular position of a rotor of the electrical motor;
   responsive to a user command, reconnecting the electrically driven door to the electricity supply grid; and
   actuating the electric motor as a function of position after the electricity supply grid voltage is reconnected.

6. The method as claimed in claim 5, wherein the electricity supply grid is connected to the drive system automatically when a command for opening or closing the door is received and the drive system is automatically disconnected from the electricity supply grid when the opening or closing of the door is terminated.

* * * * *